United States Patent [19]
Oligmueller

[11] Patent Number: 5,996,324
[45] Date of Patent: Dec. 7, 1999

[54] HYDRAULIC FEEDER REVERSER

[75] Inventor: Jeff G. Oligmueller, Colona, Ill.

[73] Assignee: Case Corporation, Racine, Wis.

[21] Appl. No.: 09/012,133

[22] Filed: Jan. 22, 1998

[51] Int. Cl.[6] .................................................. A01D 69/06
[52] U.S. Cl. .............................................. 56/11.2; 91/492
[58] Field of Search .................................. 56/10.2 J, 11.2,
56/11.7, DIG. 15, 14.5, 14.6, 10.4; 460/3,
116, 114, 119; 91/487, 486, 491, 492; 60/519,
983

[56] References Cited

U.S. PATENT DOCUMENTS

| | | |
|---|---|---|
| Re. 32,599 | 2/1988 | Musser et al. . |
| 4,138,837 | 2/1979 | Love ........................................ 56/11.2 |
| 4,376,393 | 3/1983 | Mori . |
| 4,430,847 | 2/1984 | Tourdot et al. . |
| 4,512,139 | 4/1985 | Musser et al. . |
| 4,522,110 | 6/1985 | Samuelsson . |
| 4,663,919 | 5/1987 | Stroh et al. . |
| 5,391,059 | 2/1995 | Hallundbaek . |
| 5,419,086 | 5/1995 | Duckinghaus . |
| 5,462,486 | 10/1995 | Norton . |
| 5,527,218 | 6/1996 | Van den Bossche et al. ...... 56/11.2 X |
| 5,558,003 | 9/1996 | Bauzou et al. ............................. 91/492 |
| 5,746,509 | 5/1998 | Gebhard et al. ...................... 60/456 X |
| 5,791,128 | 8/1998 | Rogalsky ................................ 56/14.5 |
| 5,836,231 | 11/1998 | Leinonen ................................. 91/491 |

*Primary Examiner*—Robert E. Pezzuto
*Attorney, Agent, or Firm*—Foley & Lardner

[57] ABSTRACT

A harvesting machine includes a feed mechanism configured for being driven in a forward direction to feed crops into the harvesting machine and a reverse drive mechanism for driving the feed mechanism in a reverse direction. The reverse drive mechanism includes a cam surface, a plurality of cam engagement members, and a plurality of pistons connected to the engagement members. One of the cam surface and the plurality of cam engagement members is operatively coupled to the feed mechanism. Controlled movement of the pistons in a first direction forces the cam engagement members into engagement with the cam surface to drive the feed mechanism in the reverse direction. Movement of each of the pistons in a second direction allows the feed mechanism to rotate in the forward direction.

9 Claims, 6 Drawing Sheets

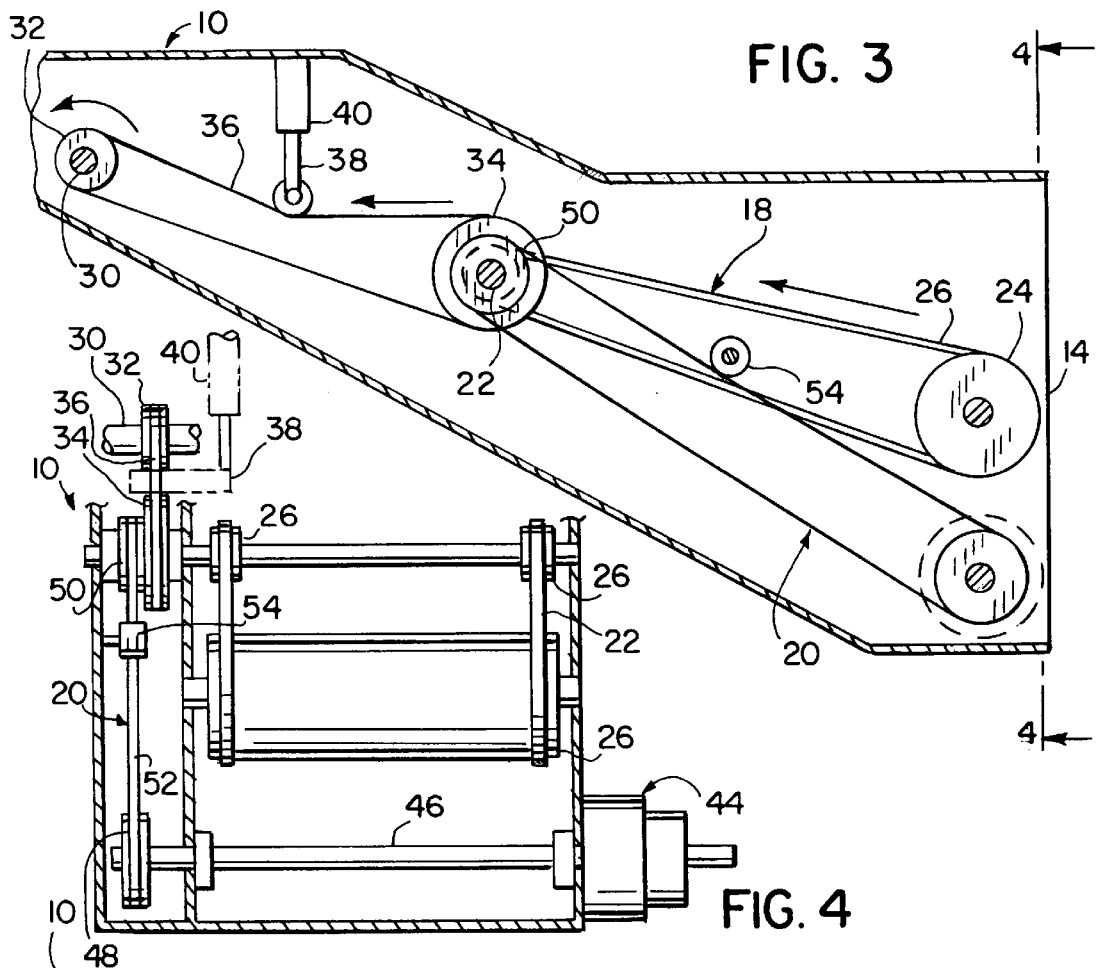
FIG. 3
FIG. 4
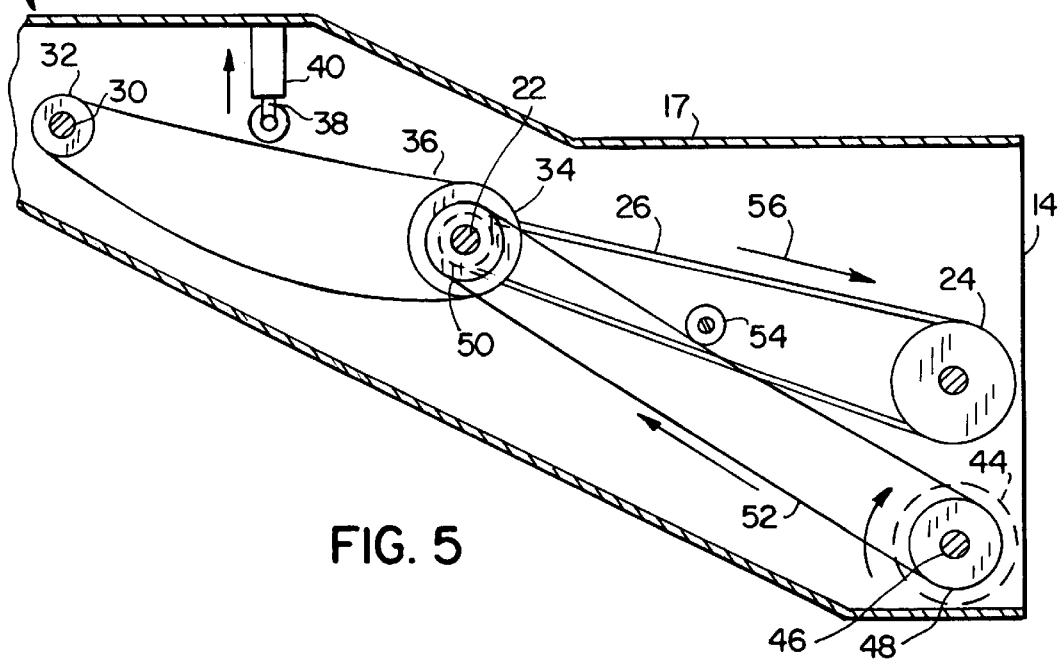
FIG. 5

HYDRAULIC FEEDER REVERSER

FIELD OF THE INVENTION

The present invention relates to feed mechanisms for feeding crops into harvesting machines. In particular, the present invention relates to drive mechanisms for driving the feed mechanism in a reverse direction to dislodge jams or remove unwanted material from the feed mechanism.

BACKGROUND OF THE INVENTION

Feed mechanisms are used by harvesting machines to convey and feed crops into the harvesting machine once the crops have been severed from the ground or other growing medium. Feed mechanisms vary in configuration depending upon the type of crop being harvested. For example, in combines, the feed mechanism typically includes a continuous chain or belt which is rotatably driven to carry corn, beans or other crops from the header into the threshing device of the combine.

During the intake of the crops into the harvesting machine, the crops frequently jam and prevent further intake of the crops. To dislodge the crops, harvesting machine feed mechanisms typically include a feeder reverser which drives the feed mechanism in a reverse direction. However, once the crops are dislodged, the feed mechanism must once again be driven in the forward direction to continue the intake of crops. As a result, the feeder reverser must be selectively engaged and disengaged with the feed mechanism to allow the feed mechanism to be driven in both the reverse direction and the forward crop intaking direction. This requirement is typically met by using a separate clutch which selectively engages and disengages the feeder reverser. Unfortunately, the separate clutch occupies precious space and increases the complexity and the cost of the harvesting machine.

SUMMARY OF THE INVENTION

The present invention is an improved harvesting machine. The harvesting machine includes a feed mechanism configured for being driven in a forward direction to feed crops into the harvesting machine and a reverse drive mechanism for driving the feed mechanism in a reverse direction. The reverse drive mechanism includes a cam surface, a plurality of cam engagement members, and a plurality of pistons connected to the engagement members. One of the cam surface and the plurality of cam engagement members is operatively coupled to the feed mechanism. Controlled movement of the pistons in a first direction forces the cam engagement members into engagement with the cam surface to drive the feed mechanism in the reverse direction. Movement of each of the pistons in a second direction allows the feed mechanism to rotate in the forward direction.

In the preferred embodiment, the pistons are movably positioned within a cylinder block. The harvesting machine includes at least one source of hydraulic pressure configured for being alternately fluidly connected to first and second opposite sides of the piston to move the pistons in the first and second directions. Preferably, the at least one source of hydraulic pressure comprises a single source of hydraulic pressure wherein the harvesting machine includes a valve mechanism for selectively fluidly connecting the source of hydraulic pressure to one of the first and second sides of the pistons. The cam surface preferably encircles the cam engagement members.

The present invention is also directed to a method of driving a feed mechanism in a reverse direction and a forward direction to feed crops into a harvesting machine. The method includes the steps of consecutively moving a plurality of cam engagement surfaces into engagement with a cam to cause relative rotation of the cam and the cam engagement surfaces in a first direction, whereby the relative rotation of the cam engagement surfaces rotatably drives an inner connected drive shaft to drive the feed mechanism in the reverse direction. The method also includes the step of disengaging each of the plurality of cam engagement surfaces from the cam to allow the cam and the cam engagement surfaces to rotate relative to one another in a second direction such that the interconnected drive shaft and the feed mechanism can be driven in a forward direction. Preferably, the step of consecutively moving the plurality of cam engagement surfaces includes consecutively pressurizing sides of the plurality of pistons connected to the plurality of cam engagement surfaces. The step of disengaging each of the plurality of cam engagement surfaces preferably includes pressurizing sides of the plurality of pistons connected to the plurality of cam engagement surfaces.

BRIEF DESCRIPTION OF THE DRAWINGS

FIG. 3 is a sectional view of the feed mechanism, the forward drive mechanism and the reverse drive mechanism taken along line 4—4 of FIG. 4;

FIG. 4 is a sectional view of the feed mechanism being driven in a forward direction of the feed mechanism being driven in forward direction by the forward drive mechanism;

FIG. 5 is a sectional view of the feed mechanism being driven in a reverse direction by the reverse drive mechanism;

DETAILED DESCRIPTION OF THE PREFERRED EMBODIMENT

Figure 1:
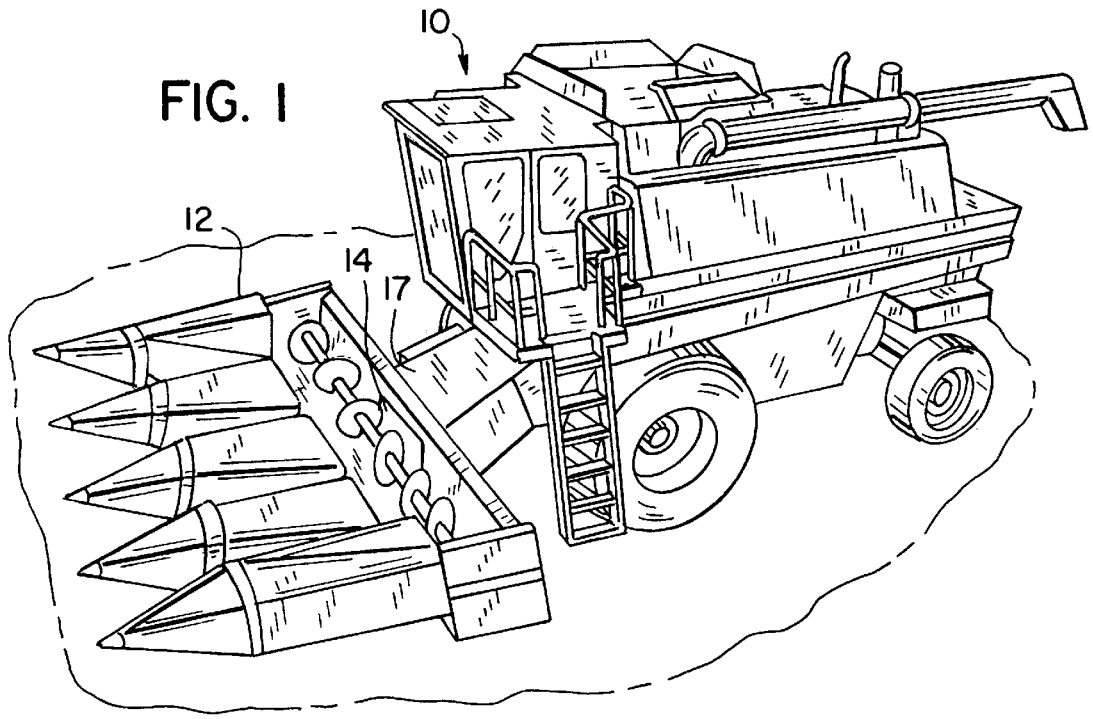
FIG. 1 is a perspective view of a harvesting machine.

FIG. 1 is a perspective view of a harvesting machine 10 supporting a header 12. As conventionally known, header 12 severs crops from the ground or other growing medium and conveys the severed crops to a central intake 14. Once conveyed to central intake 14, the crops are further conveyed from header 12 into harvesting machine 10 by a feed mechanism 16 (shown in FIGS. 2–5) within a feeder housing 17. In the exemplary embodiment illustrated, harvesting machine 10 comprises a conventionally known combine including a threshing device (not shown) that separates desirable portions of the crop plant from undesirable portions of the crop plant, such as chaff.

Figure 2:
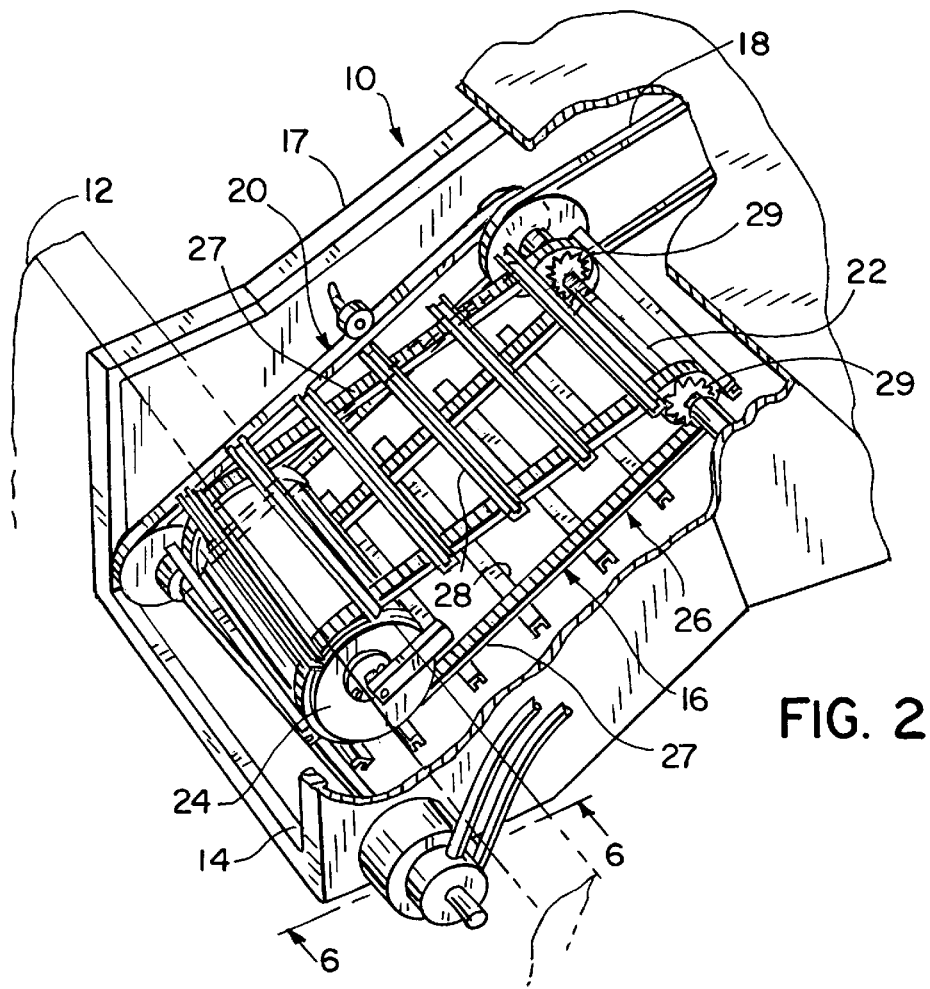
FIG. 2 is a fragmentary perspective view of the harvesting machine illustrating a feed mechanism for being driven in a forward direction by a forward drive mechanism and in a reverse direction by a reverse drive mechanism.

FIG. 2 illustrates feed mechanism 16, forward drive mechanism 18, and reverse drive mechanism 20. As best shown by FIG. 2, feed mechanism 16 extends from central intake 14 adjacent header 12 into harvesting machine 10.

Feed mechanism 16 preferably includes drive shaft 22, idler drum 24 and conveyor 26. Drive shaft 22 and idler drum 24 are rotatably supported by housing 17 at opposite ends of housing 17. Drive shaft 22 and idler drum 24 support and drivingly engage conveyor 26 to drive conveyor 26 along the length of housing 17 from central intake 14 into harvesting machine 10.

In the preferred embodiment illustrated, conveyor 26 comprises a pair of spaced chains 27 which support a plurality of spaced shovels or paddles 28 for engaging and carrying crops from central intake 14 into harvesting machine 10. To drivingly engage chains 27, drive shaft 22 includes a pair of spaced sprockets 29.

As can be appreciated, feed mechanism 16 may have a variety of alternative configurations depending upon the type of crop being harvested and the type of harvesting machine 10 in which feed mechanism 16 is employed. For example, feed mechanism 16 may alternatively include belts and sheaves, or a paddle carrying web in lieu of chains and sprockets. Feed mechanism 16 may include any one of a variety of other well known structures other than paddles for conveying crops. For example, feed mechanism 16 may alternatively comprise an auger or other well known conveying mechanisms.

Feed mechanism 16 is driven in a first forward direction by forward drive mechanism 18 and in a second opposite reverse direction by reverse drive mechanism 20. Forward driving mechanism 18 drives feed mechanism 16 so as to convey crops severed by header 12 from central intake 14 into harvesting machine 10. Reverse drive mechanism 20 is operably coupled to feed mechanism 16 and is configured for driving feed mechanism 16 in a reverse direction so as to return severed crops towards central intake 14 to dislodge any jams or remove unwanted material from feed mechanism 16 and housing 17.

FIGS. 3–5 illustrate forward drive mechanism 18 and reverse drive mechanism 20 in greater detail. As best shown by FIG. 3, forward drive mechanism 18 includes drive shaft 30, sheaves 32 and 34, belt 36, belt tensioner 38 and actuator 40. Drive shaft 30 is fixedly coupled to sheave 32 and is rotatably driven in a conventionally known manner by harvesting machine 10. Sheaves 32 and 34 are fixedly coupled to drive shaft 30 and drive shaft 22 of feed mechanism 16, respectively. Belt 36 wraps about sheaves 32 and 34 for transmitting power from drive shaft 30 to drive shaft 22. Belt tensioner 38 extends above belt 36 and is configured so as to be movable into and out of engagement with belt 36 to tighten and loosen belt 36 about sheaves 32 and 34 for selectively controlling the transmission of torque by belt 36 between sheaves 32 and 34. Actuator 40 movably supports belt tensioner 38 and moves belt tensioner 38 into and out of engagement with belt 36. As can be appreciated, various other mechanism may be used in lieu of belt tensioner 38 and actuator 40 to control the transmission of torque by belt 36.

FIG. 4 illustrates belt tensioner 38 moved into engagement with belt 36 by actuator 40. As a result, as drive shaft is rotatably driven in a conventionally known manner, belt 36 transmits power from drive shaft 30 to drive shaft 22 to rotatably drive shaft 22 such that feed mechanism 16 is driven in a forward direction to convey crops from central opening 14 into harvesting machine 10.

FIG. 3 further illustrates reverse drive mechanism 20 in greater detail. As best shown by FIG. 3, reverse drive mechanism includes motor 44, drive shaft 46, sheaves 48, 50, belt 52 and idler 54. Motor 44 is coupled to shaft 46 so as to rotatably drive shaft 46. Sheaves 48 and 50 are fixedly coupled to shafts 46 and 22, respectively. Belt 52 encircles sheaves 48 and 50 for transmitting power between sheaves 48 and 50. Belt 52 is preferably maintained in tension by idler 54.

FIG. 5 illustrates reverse drive mechanism 20 actuated so as to drive feed mechanism 16 in a reverse direction for dislodging jams or for removing unwanted material from feeder housing 17 of harvesting machine 10. As best shown by FIG. 5, motor 44 drives sheaves 48 to transmit power via belt 52 to sheaves 50 and shaft 22 of feed mechanism 16. As a result, feed mechanism 16 (shown in FIG. 2) is driven in a reverse direction, as indicated by arrow 56. To enable shaft 22 of feed mechanism 16 to be driven in a reverse direction while coupled to forward drive mechanism 18, tensioner 38 of forward drive mechanism 18 is retracted by actuator 40 to permit belt 36 to loosely encircle sheaves 32 and 34. Consequently, sheaves 34 may be rotatably driven in a reverse direction without transmitting power to drive shaft 30 by belt 36. Although forward drive mechanism 18 is illustrated as including a belt tensioner 38 and an actuator 40 for selectively engaging and disengaging forward drive mechanism 18 to and from feed mechanism 16, other configurations and methods may also be used for such purposes. Although forward drive mechanism 18 and reverse drive mechanism 20 are illustrated as including sheaves for engaging and driving belts, forward drive mechanism 18 and reverse drive mechanism 20 may alternatively comprise other well-known torque transmitting structures, such as gears, chains and sprockets.

Figure 6:
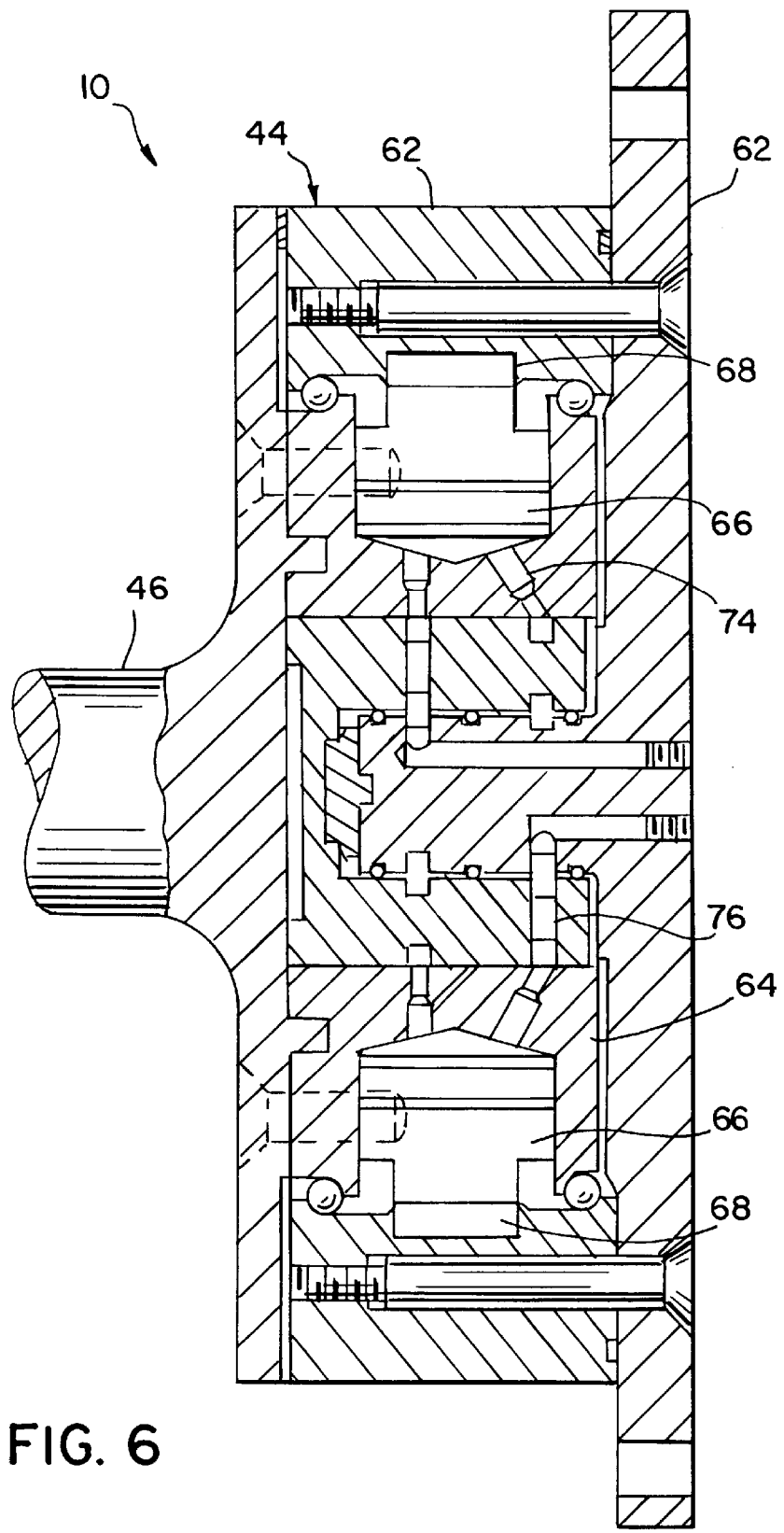
FIG. 6 is a sectional view of a motor of the reverse drive mechanism.
Figure 7:
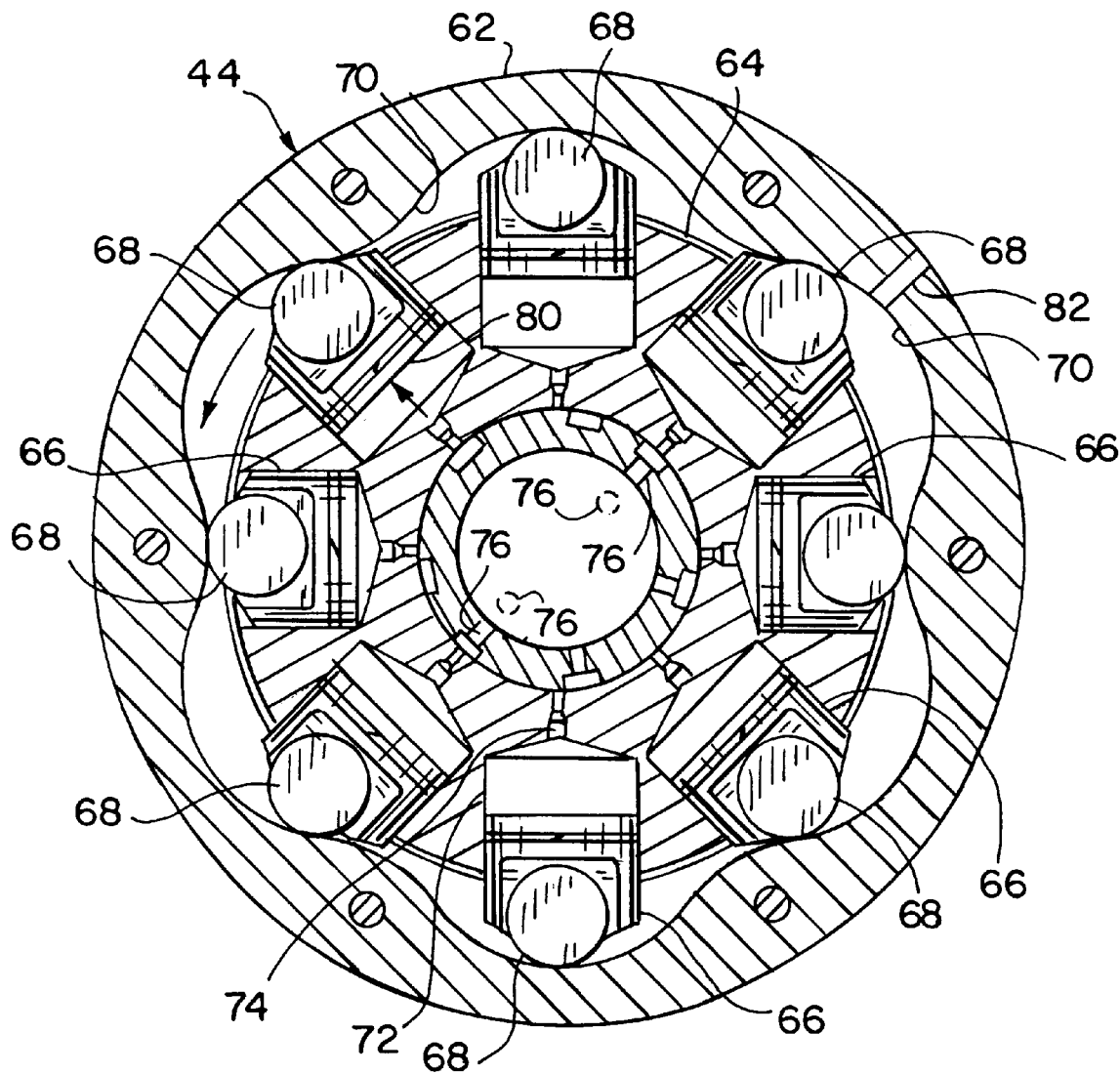
FIG. 7 is a cross-sectional view of a motor of the reverse drive mechanism driving the feed mechanism in the reverse direction.
Figure 8:
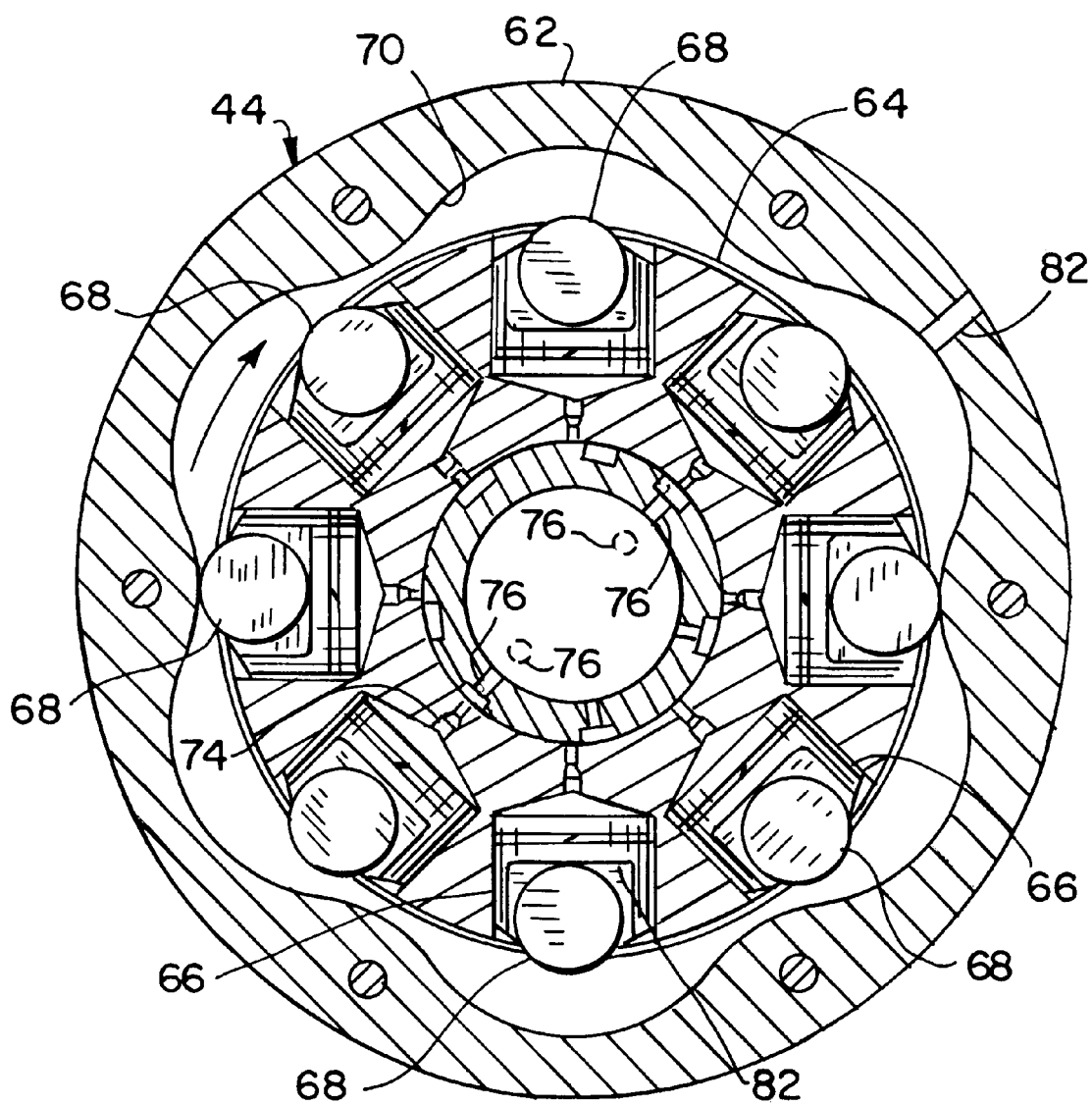
FIG. 8 is a cross-sectional view. of the motor of the reverse drive mechanism while the feed mechanism is being driven in a forward direction.
Figure 9:
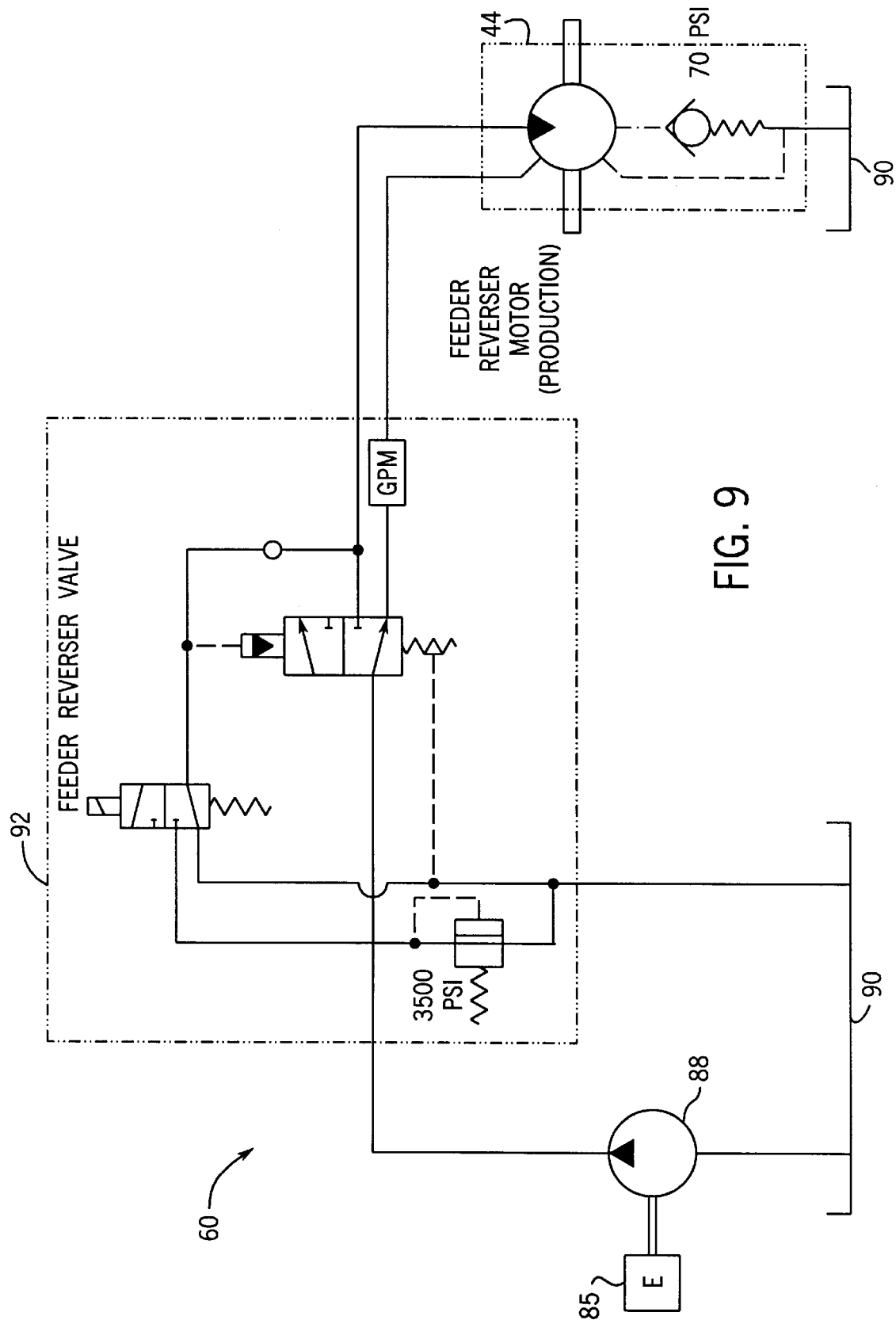
FIG. 9 is schematic illustrating a hydraulic system for powering the motor.

FIGS. 6–9 illustrate motor 44 in greater detail. FIG. 6 is a sectional view illustrating motor 44. FIGS. 7 and 8 are cross-sectional views of motor 44. FIG. 9 is a schematic illustrating hydraulic system 60 for powering motor 44. As shown by FIGS. 6-8, motor 44 generally includes case 62, cylinder block 64, pistons 66 and cam engagement members 68. Case 62 is a generally annular-shaped ring encircling and enclosing the cylinder block 64, pistons 66 and cam engagement member 68. Case 62 is fixedly coupled to feeder housing 17 (shown in FIG. 2). Case 62 forms cam surface 70 along its inner diameter. Cam surface 70 is wave-shaped and interacts with cam engagement member 68 to cause cylinder block 64 to rotate within case 62.

Cylinder block 64 is fixedly coupled to shaft 46 and includes a plurality of cylinders 72 and corresponding channels 74. Cylinders 72 are sized for receiving and slidably guiding pistons 66. Channels 74 communicate between cylinders 72 and distributor valve 65.

Distributor valve 65 is secured to case 62 and extends within cylinder block 64. Distributor valve 65 includes a plurality of channels 76 communicating between a source of hydraulic pressure, such as hydraulic system 60 (shown in FIG. 9) and channels 74 of cylinder block 64.

Pistons 66 are movably supported within cylinders 72 and extend radially outwardly and support cam engagement member 68. Cylinders 72 extend radially outwardly in cylinder block 64 at equi-distant angular distances. Channels 76 are preferably sealed against cylinder block 64 while enabling cylinder block 64 to rotate about distributor valve 65.

Cam engagement member 68 preferably comprise rollers rotatably coupled to pistons 66. Cam engagement member 68 project outwardly beyond pistons 68 for engagement with cam surface 70.

FIG. 7 illustrates motor 44 actuated so as to drive shaft 46 and feed mechanism 16 in the reverse direction. As shown by FIG. 7, upon actuation of reverse drive mechanisms 20, hydraulic oil under pressure is supplied through channel 76 of distributor valve 65 and through channels 74 within cylinder block 64 so as to pressurize the first side 80 of pistons 66 to move pistons 66 radially outwardly within cylinders 72 to force cam engagement members 68 into engagement with cam surface 70. This hydraulic pressure is selectively applied to and withdrawn from first side 80 of pistons 66 so as to selectively and consecutively engage cam engagement members 68 against cam surface 70 to rotatably drive cylinder block 64 and interconnected shaft 46 within case 62. As a result, reverse drive mechanism 20 drives feed mechanism 16 in a reverse direction.

FIG. 8 illustrates reverse drive mechanism 20 actuated to enable shaft 46 to freely rotate as forward drive mechanism 18 drives feed mechanism 16 in a forward direction. As shown by FIG. 8, hydraulic fluid is supplied between case 62 and cylinder block 62 via channel 82. The hydraulic pressure inside case 62 acts upon a second opposite side 82 of pistons 66 to push pistons 66 into cylinder to simultaneously push each of pistons 66 into cylinders 72 to allow cylinder block 64 to freely rotate or free wheel within case 62. Alternatively, the hydraulic fluid adjacent the second opposite side 82 of pistons 66 may be vented. As a result, motor 44 may be attached directly to feeder drive shaft 22 without any type of clutching device between motor 44 and drive shaft 22. To actuate reverse feed mechanism 20, the interior of case 62 is vented and hydraulic pressure is consecutively applied to sides 80 of pistons 66.

FIG. 9 is a schematic of hydraulic system 60 used for driving motor 44. Hydraulic system 60 includes engine 85, hydraulic pump 88, hydraulic reservoir 90 and feeder reverser valve 92. Engine 85 of harvesting machine 10 drives pump 88 which draws hydraulic fluid from reservoir 90 and supplies hydraulic fluid under pressure to feeder reverser valve 92. Feeder reverser valve 92, in a conventionally known manner, selectively applies hydraulic fluid, under pressure, to channels 76 and 82 via hydraulic lines 94 to selectively drive feed mechanism 18 in a reverse direction or to enable forward drive mechanism 18 to drive feed mechanism 16 in the forward direction. As discussed above, motor 44 may be directly attached to feeder drive shaft 22 without any type of clutching device between motor 44 and drive shaft 22. Consequently, reverse drive mechanism 20 is less expensive and occupies less space.

Although the present invention has been described with reference to preferred embodiments, workers skilled in the art will recognize that changes may be made in form and detail without departing from the spirit and scope of the invention. For example, motor 44 may alternatively comprise any one of a variety of well-known and conventional hydraulic radial piston motors, such as those commonly sold by Rexroth Corporation of Booster, Ohio. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A harvesting machine comprising:
    a feed mechanism;
    a forward drive mechanism coupled to the feed mechanism and configured to drive the feed mechanism in a forward direction to feed crops into the harvesting machine;
    an actuator configured to couple and uncouple the forward drive mechanism to the feed mechanism;
    a reverse drive mechanism coupled to the feed mechanism and configured to drive the feed mechanism in a reverse direction, the reverse drive mechanism including:
        a cam surface;
        a plurality of cam engagement members, wherein one of the cam surface and the plurality of cam engagement members is operatively coupled to the feed mechanism; and
        a plurality of pistons connected to the engagement members, wherein controlled movement of the pistons in a first direction forces the cam engagement members into engagement with the cam surface to drive the feed mechanism in the reverse direction and wherein movement of each and all of the pistons in a second direction moves each cam engagement surface simultaneously out of engagement with the cam surface to allow the feed mechanism to rotate in the forward direction while the forward drive mechanism drives the feed mechanism in the forward direction and while said one of the cam and the cam engagement surface remains coupled to the feed mechanism.

2. The harvesting machine of claim 1, wherein the pistons are movably positioned within a cylinder block and wherein the harvesting machine includes at least one source of hydraulic pressure configured for being alternately fluidly connected to first and second opposite sides of the pistons to move the pistons in the first and second directions.

3. The harvesting machine of claim 2, wherein said at least one source of hydraulic pressure comprises a single source of hydraulic pressure and wherein the harvesting machine further includes a valve mechanism for selectively fluidly connecting the source of hydraulic pressure to one of the first and second sides of the pistons.

4. The harvesting machine of claim 1, wherein the reverse drive mechanism comprises a hydraulic radial piston motor.

5. The harvesting machine of claim 1, wherein the cam surface encircles the cam engagement members.

6. A method of driving a feed mechanism in a reverse direction and a forward direction to feed crops into a harvesting machine, the method comprising:
    consecutively moving a plurality of cam engagement surfaces into engagement with a cam to cause relative rotation of the cam and the cam engagement surfaces in a first direction, whereby the relative rotation of the cam and the cam engagement surfaces rotatably drives an interconnected drive shaft to drive the feed mechanism in the reverse direction;
    simultaneously disengaging each of the plurality of cam engagement surfaces from the cam to allow the cam and the cam engagement surfaces to rotate relative to one another in a second direction such that the interconnected drive shaft and the feed mechanism can be driven in a forward direction; and
    driving the interconnected drive shaft and the feed mechanism in the forward direction while all of the plurality of cam engagement surfaces float relative to the cam.

7. The method of claim 6, wherein the step of consecutively moving the plurality of cam engagement surfaces includes:
    consecutively pressurizing sides of a plurality of pistons connected to the plurality of cam engagement surfaces.

8. The method of claim 6, wherein the step of disengaging each of the plurality of cam engagement surfaces includes pressuring sides of a plurality of pistons connected to the plurality of cam engagement surfaces.

9. A harvesting machine comprising:

a feed mechanism;

means for driving the feed mechanism in a first direction to feed crops into the harvesting machine;

a cam surface;

a plurality of cam engagement surfaces moveable into engagement with the cam surface, wherein one of the cam surface and the plurality of cam engagement surfaces is operatively coupled to the feed mechanism; and means for consecutively moving the plurality of cam engagement surfaces into engagement with the cam surface to cause relative rotation of the cam surface and the cam engagement surfaces, whereby the relative rotation of the cam and the cam engagement surfaces rotatably drives the feed mechanism in a second opposite direction; and means for disengaging each of the plurality of cam engagement surfaces simultaneously from the cam surface to allow the cam surface and the cam engagement surfaces to rotate relative to one another such that the feed mechanism can be driven in the first direction by the means for driving.

* * * * *